(12) United States Patent
Choi

(10) Patent No.: US 8,576,122 B2
(45) Date of Patent: Nov. 5, 2013

(54) METHOD FOR MEASURING LOCATION OF MOBILE TERMINAL

(75) Inventor: Byung Hyun Choi, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 244 days.

(21) Appl. No.: 13/157,690

(22) Filed: Jun. 10, 2011

(65) Prior Publication Data

US 2011/0304506 A1    Dec. 15, 2011

(30) Foreign Application Priority Data

Jun. 15, 2010  (KR) .................. 10-2010-0056598
Aug. 3, 2010   (KR) .................. 10-2010-0074929

(51) Int. Cl.
*G01S 3/02*    (2006.01)
(52) U.S. Cl.
USPC ............................................. 342/450

(58) Field of Classification Search
USPC ........................................................ 342/450
See application file for complete search history.

(56) References Cited

U.S. PATENT DOCUMENTS

| | | | |
|---|---|---|---|
| 8,046,169 B2* | 10/2011 | Mazlum et al. ............... 701/472 |
| 2005/0075111 A1* | 4/2005 | Tafazolli et al. ............ 455/456.1 |
| 2009/0047925 A1* | 2/2009 | Rahman ...................... 455/404.2 |
| 2009/0177382 A1* | 7/2009 | Alles et al. .................. 701/208 |
| 2010/0190509 A1* | 7/2010 | Davis .......................... 455/456.1 |
| 2010/0299060 A1* | 11/2010 | Snavely et al. ............... 701/201 |

* cited by examiner

*Primary Examiner* — Harry Liu
(74) *Attorney, Agent, or Firm* — Saliwanchik, Lloyd & Eisenschenk

(57) ABSTRACT

A method for measuring a location of a mobile terminal includes calculating first location information by using a ToA (Time of Arrival) scheme, calibrating the first location information by using angle information between two base stations and the terminal; calculating second location information by using an AoA (Angle of Arrival) scheme, and calculating a location value of the terminal by using the calibrated first location information and the second location information.

11 Claims, 9 Drawing Sheets

(a)

(b)

(a)

(b)

METHOD FOR MEASURING LOCATION OF MOBILE TERMINAL

CROSS-REFERENCE TO RELATED APPLICATIONS

This application claims the benefit under 35 U.S.C. §119 to Korean Patent Application Nos. 10-2010-074929, filed Aug. 3, 2010, and 10-2010-0056598, filed Jun. 15, 2010, which are hereby incorporated by reference in their entirety.

BACKGROUND OF THE INVENTION

1. Field of the Invention

The present invention relates to a method for measuring a location of a mobile terminal and, more particularly, to a method for measuring a location of a mobile terminal according to a ToA (Time of Arrival) scheme or according to a combination of the ToA scheme and an AoA (Angle of Arrival) scheme by using a plurality of base station signals and collecting location information by using angle information between the mobile terminal and base stations, thus reducing a location measurement error when the base stations and the mobile terminal are located within a short distance.

2. Description of the Related Art

Recently, research into a technique for measuring a location of a mobile terminal in a communication network is actively ongoing in line with the development of a mobile communication technology.

Methods for measuring a location of a mobile terminal include a technique of recognizing an accurate location of a service requesting terminal by using a Global Positioning System (GPS) or utilizing the location of a base station of a wireless network, a network scheme and a terminal scheme, a hybrid scheme combining these methods, and the like.

The GPS using signals received from artificial satellites is dependent upon the strength of the satellite signals, a GPS receiver needs be installed in a location measurement target terminal, and the GPS cannot be used in an indoor area in which a GPS reception is not available. Thus, in order to solve this limitation, methods for estimating the location of a mobile terminal by using the mobile communication characteristics such as GSM, CDMA, and the like, have been frequently introduced. Typical examples of the methods include a Cell ID for recognizing the location of a user through a service cell ID of a base station to which the user belongs, AoA (Angle Of Arrival) using the difference in a signal reception angle in three base stations which have received a signal of a terminal, ToA (Time Of Arrival) using the difference in a signal arrival time between one base station and two neighbor base stations, TDoA for measuring a signal delay of adjacent base stations based on a base station signal, and the like.

The location measurement methods are on the assumption that three or more base station signals can be received; however, the probability in which a terminal receives three or more base station signals is 92% in downtown and merely 71% in rural areas, indicating that the accuracy of the location measurement is low.

Also, the location measurement method is based on the assumption that a base station and a terminal are located to be sufficiently far away from each other. With reference to FIG. 1A, when the base station and the terminal are located to be sufficiently far away from each other, a vertical distance $h_1$ from a plane on which the terminal is located to the base station is sufficiently small compared with the distance $d_1$ from the base station to the terminal, having the relationship of $d1 \neq d1'$, so the location information according to ToA is calculated by using $d_1$ to measure the location of the terminal. However, when the base station and the terminal are located within a short distance as shown in FIG. 1B, a vertical distance h2 from a plane on which the terminal is located to the base station is not sufficiently small compared with the distance $d_2$ from the base station to the terminal, having the relationship of $d2 \neq d2'$. Thus, in this case, if the location information according to ToA is calculated by using $d_2$, a great error would be generated in measuring the location of the terminal.

BRIEF SUMMARY

Accordingly, the present invention is directed to a method for measuring the location of a mobile terminal that substantially obviates one or more problems due to limitations and disadvantages of the related art.

An object of the present invention is to provide a method for measuring the location of a mobile terminal capable of measuring the location of a mobile terminal by using two base station signals according to both ToA (Time of Arrival) and AoA (Angle of Arrival) schemes and correcting the location information according to the ToA scheme by using angle information between the mobile terminal and the base stations, thus reducing an error in measuring the location of the mobile terminal when the base station and the mobile terminal are located within a short distance.

Another object of the present invention is to provide a method for measuring the location of a mobile terminal capable of calculating distance information between a mobile terminal and three base stations by the three base stations by using ToA of a signal transmitted from the terminal and correcting the distance information by using angle information between the terminal and the base stations, thus reducing an error in measuring the location of the mobile terminal when the base stations and the mobile terminal are located within a short distance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for measuring the location of a mobile terminal, including: calculating first location information by using a ToA (Time of Arrival) scheme; calibrating the first location information by using angle information between two base stations and the terminal; calculating second location information by using an AoA (Angle of Arrival) scheme; and calculating a location value of the terminal by using the calibrated first location information and the second location information.

In the calculating of the first location information by using the ToA scheme, two items of distance information between the two base stations and the terminal may be calculated by using two items of time information as a ToA of the signals transmitted from the terminal to the two base stations, and the first location information may be calculated by using the two items of distance information.

The angle information may include segments extending from the two base stations and formed to be perpendicular to the plane on which the terminal is located and two angles formed by the segments connecting the two base stations and the terminal, respectively.

In the calibrating of the first location information by using the angle information between the two base stations and the terminal, the first location information may be calibrated by using two items of distance information which have been corrected by multiplying the two items of distance information by a sine value of the two angles.

In the calculating of the second location information by using the AoA scheme, the second location information may be calculated by using two items of AoA information regarding the signals transmitted from the terminal to the two base stations.

In another aspect of the present invention, there is provided a method for measuring the location of a mobile terminal, including: calculating distance information between each of three base stations and the terminal by using a ToA (Time of Arrival) with respect to the three base stations adjacent to the terminal; correcting the distance information by using angle information between each of the base stations and the terminal; and calculating a location value of the terminal by using the corrected distance information.

The angle information may include segments extending from the three base stations and formed to be perpendicular to the plane on which the terminal is located and three angles formed by the segments connecting the three base stations and the terminal, respectively.

In the correcting of the distance information, the distance information with respect to the respective base stations may be corrected by multiplying the distance information by a sine value of the angles.

In the calculating of the location value of the terminal by using the corrected distance information, three circles having the locations of the respective base stations as a center and having the corrected distance as a radius may be formed and the location value of the terminal may be calculated starting from a portion in which the three circles overlap.

The three angles may include an error angle.

In the calculating of the location value of the terminal by using the corrected distance information, the location value of the terminal may be calculated starting from a portion in which three doughnut-like shapes formed based on the locations of the respective base stations according to the corrected distance information by using the angle information including the error angle.

According to the method for measuring the location of a mobile terminal having the foregoing configuration, the location of a terminal can be measured only with two base station signals by using both the ToA and AoA schemes, and in particular, when a base station and the terminal are located within a short distance, a location measurement error can be significantly reduced by correcting the location information according to the ToA scheme by using angle information between the base station and the terminal.

According to the method for measuring the location of a mobile terminal having the foregoing configuration, when the base station and the terminal are located within a short distance, a location measurement error of the terminal can be significantly reduced by correcting the distance information calculated from a ToA by using angle information between the terminal and the base station. Also, a three-dimensional location value of the terminal can be calculated by using the angle information between the terminal and the base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
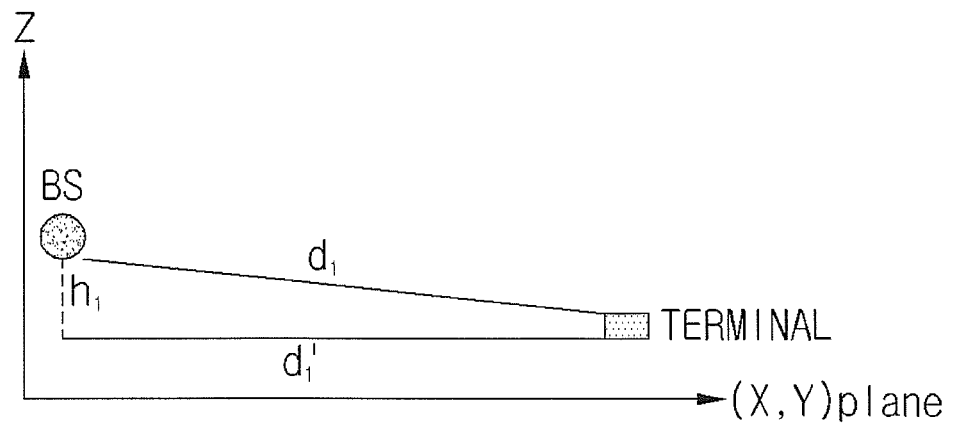
FIGS. 1A and 1B are views for explaining a location measurement error in using related art location measurement method when a base station and a terminal are located within a short distance.
Figure 1:
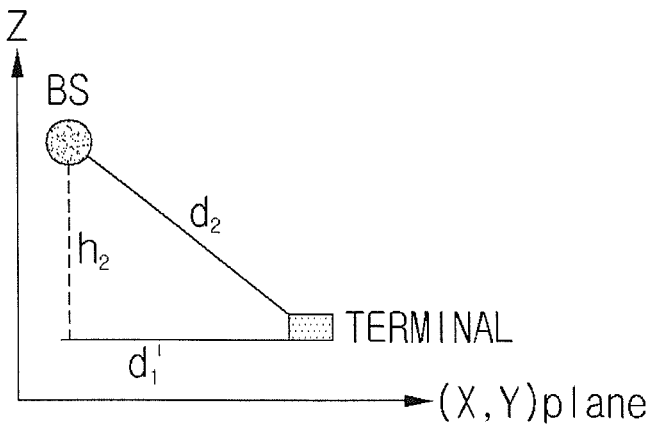
Figure 2:
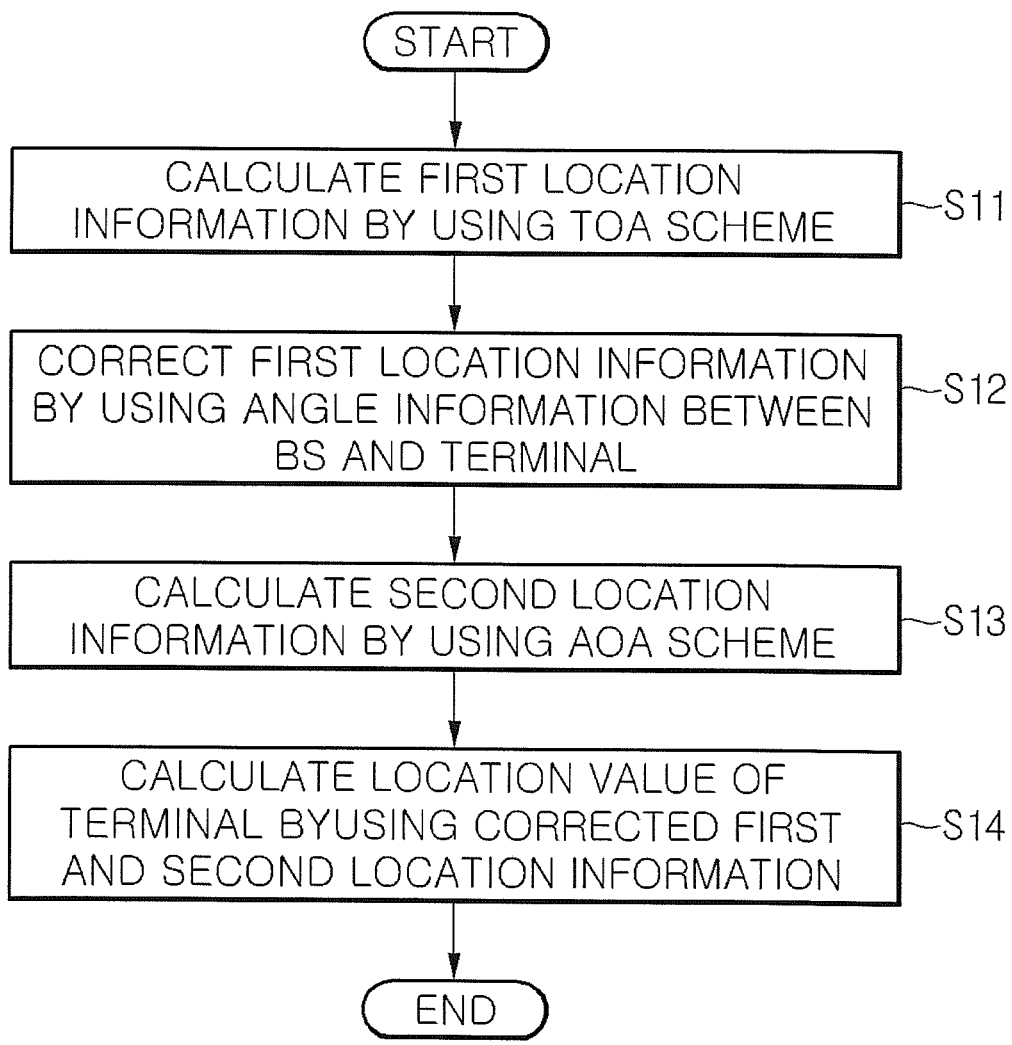
FIG. 2 is a flowchart illustrating the process of a method for measuring the location of a mobile terminal according to an exemplary embodiment of the present invention.

FIG. 2 is a flowchart illustrating the process of a method for measuring the location of a mobile terminal according to an exemplary embodiment of the present invention.

With reference to FIG. 2, first location information is calculated by using a ToA (Time of Arrival) scheme in operation S11. Namely, the first location information is calculated by using two items of time information, a ToA of each of signals between two base stations and a terminal as a location measurement target. First, the distance between each of the two base stations and the terminal by using the two items of time information, the ToA of each of the signals transmitted from the two base stations to the terminal. To calculate the first location information of the terminal by using the distance from the base station to the terminal, there is used Equation 1 below:

$$(x_0-x_1)^2+(y_0-y_1)^2 \le d_1^2$$

$$(x_0-x_2)^2+(y_0-y_2)^2 \le d_2^2 \quad \text{Equation 1}$$

In Equation 1, (x0, y0) denotes the location of the terminal as a location measurement target, (x1, y1) and (x2, y2) denote the locations of the two base stations, respectively, and $d_1$, and $d_2$ denote the distances from the two base stations to the terminal, respectively.

It is noted in Equation 1 that the location (x0, y0) of the terminal as a location measurement target is the inside of a circle having the first base station located at $(x_0, y_0)$ and the second base station located at $(x_1, y_1)$ as the center and having radiuses $d_1$ and $d_2$, respectively. When Equation 1 is calculated in union, the terminal as a location measurement target is located at a portion in which the circle having $(x_1, Y_1)$ as the center and having the radius $d_1$ and the circle having $(x_2, y_2)$ as the center and having the radius $d_2$ overlap. Namely, the first location information can be calculated by calculating Equation 1 in union.

After the first location information of the terminal is calculated by using the ToA scheme, the first location information is calibrated by using angle information between the base station and the terminal in operation S12.

The reason for correcting the first location information is because it relates to the method for measuring the location of the mobile terminal when the base station and the terminal are located within a short distance. Namely, when the base station and the terminal are located within a short distance, a vertical distance from the plane on which the terminal is located to the location of the base station is not such short as to be negligible compared with the distance between the base station and the terminal. Thus, because there is a considerable difference between the distance from the point of the base station projected to the plane on which the terminal is located to the terminal and the distance between the base station and the terminal, a great error occurs when the location of the terminal is measured according to the ToA scheme by using the distance between the base station and the terminal.

Thus, in the method for measuring the location of a mobile terminal according to an exemplary embodiment of the present invention, first, the distance from the base station to the terminal is calculated by using two items of time information, a ToA of the signals between the two base stations and the terminal as the location measurement target, and angle information between the base stations and the terminal is derived. The distance from each of the base stations to the terminal is calibrated by using the angle information, and calibrated first location information of the terminal is calculated by Equation 1. The calibration of the first location information will be described in detail with reference to FIGS. 3 and 4.

Next, second location information is calculated by using an AoA scheme in operation S13. The second location information is calculated by using AoA information of transmission signals between each of the two base stations and the terminal as a location measurement terminal. Since the base stations receive the signal which has passed through a medium allowing a signal to transmit therethrough and the reflection signal, an error may be generated in measuring the location of the terminal according to which of the directions in which the signals have been received is determined as an AoA. Thus, the AoA information may include the two items of the AoA information regarding the signals received by the base station and two items of error AoA information corresponding to each error.

A location value of the terminal is calculated by using the calibrated first location information and the second location information in operation S14. The method for measuring the location of the mobile terminal according to the present exemplary embodiment uses both the ToA scheme using two items of time information and the AoA scheme using two items of angle information to measure the location of the terminal in the environment of the two base stations. In this case, the location value of the terminal may be calculated by combining the first location information, a part repeated in using the two items of time information according to the ToA scheme and the second location information, a part repeated in using the two items of AoA information according to the AoA information. Namely, the distance from each of the two base stations to the terminal is calculated from the two items of time information according to the ToA scheme, and the location value of the terminal is calculated by using the AoA information and the error AoA information according to the AoA in the section in which two circles having the two base stations as the center and the distance from the base stations to the terminal as a radius overlap.

The calibration of the first location information will now be described in detail with reference to FIGS. 3 and 4.

Figure 3:
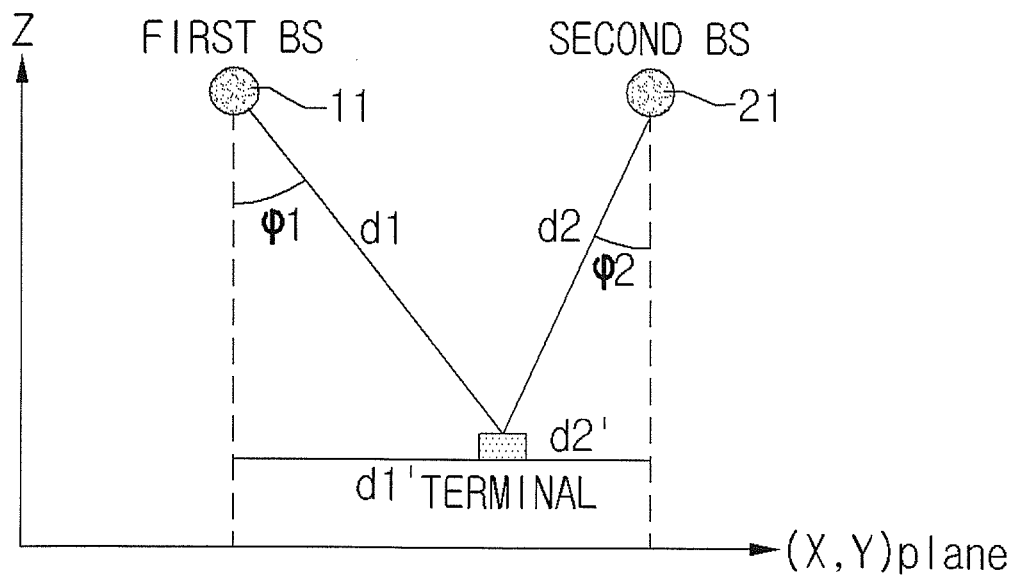
FIG. 3 is a view for explaining angle information between base stations and a terminal.

FIG. 3 is a view for explaining angle information between base stations 11 and 21 and a terminal 31.

With reference to FIG. 3, the method for measuring the location of a mobile terminal according to an exemplary embodiment of the present invention is applied when the base stations 11 and 21 and the terminal 31 are located within a short distance so vertical distances from the plane on which the terminal 31 is located, i.e., from the xy plane, to the first base station 11 and to the second base station 21 are not such short as to be negligible compared with the distances $d_1$ and $d_2$ between the first base station 11 and the second base station 21 and the terminal 31. Namely, when the base stations 11 and 21 and the terminal 31 are located within a short distance, there is a considerable difference between the distances $d_1'$ and $d_2'$ from the points formed by moving the first and second base stations 11 and 21 to the plane on which the terminal 31 is located such that they are perpendicular to the plane to the terminal 31 and the distances $d_1$ and $d_2$ between the first and second base stations 11 and 21 and the terminal 31. Thus, in the ToA scheme in which the location information is calculated by calculating the respective distances from the two base stations 11 and 21 to the terminal 31 by using the two items of time information, ToA of the transmission signals between the first and second base stations 11 and 21 and the terminal 31, the distances are corrected to calibrate the location information, thus reducing a location measurement error of the terminal 31.

In calibrating the location information, the distance between the base stations 11 and 21 and the terminal 31 calculated by using the two items of time information and angle information between the base stations 11 and 21 and the terminal 31 are required. The angle information include an angle ϕ1 between a segment formed by vertically connecting the first base station 11 to the plane on which the terminal 31 is located and a segment formed by connecting the first base station 11 to the terminal 31 and an angle ϕ2 between a segment formed by vertically connecting the second base station 21 to the plane on which the terminal 31 is located and a segment formed by connecting the second base station 21 to the terminal 31.

The correction of the distance between the base stations 11 and 21 and the terminal 31 by using the angle information is performed by Equation 2 shown below:

$$d_1' = d_1 \times \sin(\phi_1)$$

$$d_2' = d_2 \times \sin(\phi_2) \qquad \text{Equation 2}$$

In Equation 2, $d_1$ denotes the distance between the first base station 11 and the terminal 31, $d_2$ denotes the distance between the second base station 21 and the terminal 31, $d_1'$ denotes the corrected distance between the first base station 11 and the terminal 31, and $d_2'$ denotes the corrected distance between the second base station 21 and the terminal 31.

The calculation of the first location information of the terminal 31 by using the corrected distance between the base stations 11 and 21 and the terminal 31 is performed by Equation 3 shown below. It is assumed that, on the xy plane, (x0, y0) denotes the location of the terminal 31 as the location measurement target, and (x1, y1) and (x2, y2) denote the locations of the two base stations 11 and 21, respectively.

$$(x_0-x_1)^2-(y_0-y_1)^2 \le d_1'^2$$

$$(x_0-x_2)^2+(y_0-y_2)^2 \le d_2'^2 \qquad \text{Equation 3}$$

In equation 3, it is noted that the location (x0, y0) of the terminal 31 as the location measurement target is the inside of a circle having the first base station 11 located at $(x_1, y_1)$ and the second base station 21 located at $(x_2, y_2)$ as the center and having radiuses $d_1'$ and $d_2'$, respectively. When Equation 3 is calculated in union, the terminal as a location measurement target is located at a portion in which the circle having (x1, y1) as the center and having the radius $d_1'$ and the circle having (x2, y2) as the center and having the radius $d_2'$ overlap. Namely, the first location information can be calibrated by calculating Equation 3 in union. A reduction in the error of the location value of the terminal 31 as the location measurement target by calibrating the first location information will now be described with reference to FIG. 4

Figure 4:
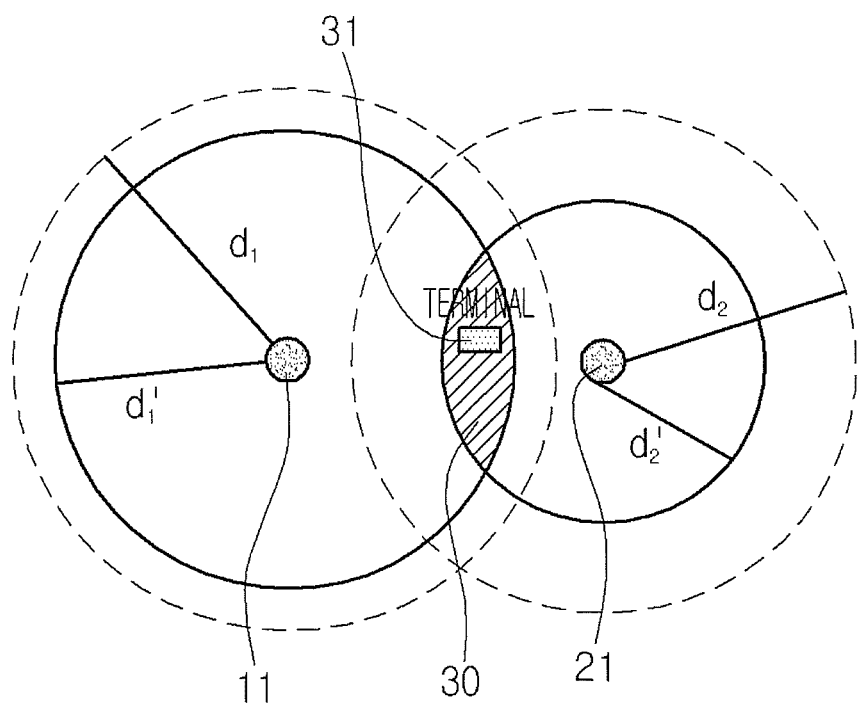
FIGS. 4 and 5 are views for explaining a correction of location information by using a ToA (Time of Arrival) scheme in the method for measuring the location of a mobile terminal according to an exemplary embodiment of the present invention.
Figure 5:
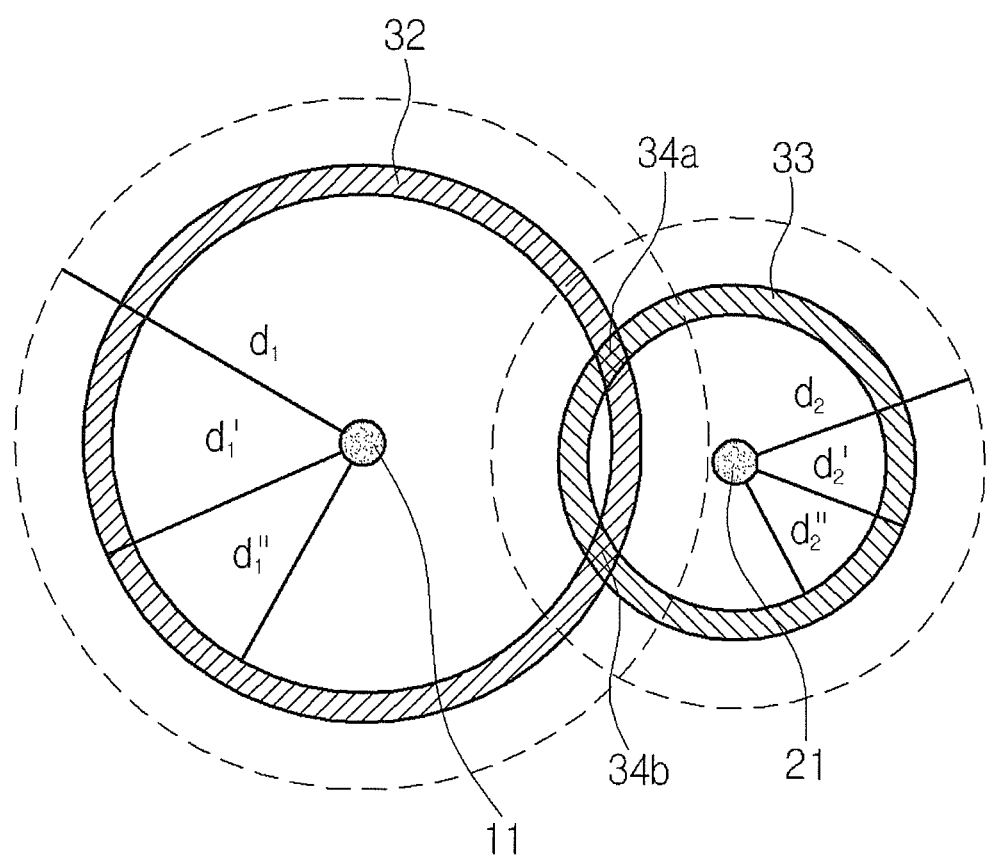

FIGS. 4 and 5 are views for explaining a correction of location information by using a ToA (Time of Arrival) scheme in the method for measuring the location of a mobile terminal according to an exemplary embodiment of the present invention.

With reference to FIG. 4, two circles having the first base station 11 located at $(x_1, y_1)$ and the second base station 21 located at $(x_2, y_2)$ as the center and having radiuses $d_1'$ and $d_2'$, the distance between the base stations 11 and 21 and the terminal 31 calculated by using the two items of time information according to the ToA scheme, respectively, are illustrated in dotted lines. An area in which the two circles overlap refers to the results obtained by calculating Equation 1 in union, and the first location information of the terminal belongs to the area in which the two circles overlap as indicated by the dotted lines.

Also, with reference to FIG. 4, two circles having the first base station 11 located at $(x_1, y_1)$ and the second base station 21 located at $(x_2, y_2)$ as the center and having radiuses $d_1'$ and $d_2'$, the distance between the base stations 11 and 21 and the terminal 31 corrected by using the angle information $\phi 1$, $\phi 2$ between the base stations 11 and 21 and the terminal 31, respectively, are illustrated in solid lines. An area 30 in which the two circles overlap refers to the results obtained by calculating Equation 3 in union, and the corrected first location information of the terminal belongs to the area 30 in which the two circles overlap as indicated by the solid lines.

It is noted that the error of the location value of the terminal as the location measurement target has been reduced by comparing the area in which the two circles indicated by the dotted lines, i.e., the first location information before being corrected according to the angle information between the base stations 11 and 21 and the terminal 31, overlap and the area 30 in which the two circles indicated by the solid lines, i.e., the first location information corrected according to the angle information between the base stations and the terminal. Namely, it is noted that the size of the area 30 in which the two circles indicated by the solid lines overlap is narrower than the size of the area in which the two circles indicated by the dotted lines overlap. The location value of the terminal is calculated by using the AoA information and the error AoA information of the signals transmitted to the base stations by using the AoA scheme and in the area 30 in which the two circles overlap. Thus, as the area in which the two circles overlap is reduced, the location measurement error of the terminal is reduced and the accuracy can be improved.

Also, like the error which can be generated in the AoA of the signal in the AoA scheme, an error angle may be included in the angle information formed between the base stations and the terminal. The angle information in consideration of the error angle is $\phi 1 \pm e1$ over the first base station 11 and $\phi 2 \pm e2$ over the second base station 21. The first location information corrected by using the angle information without the error angle corresponds to the area 30 in which the two circles overlap as shown in FIG. 4. Meanwhile, the first location information corrected by using the angle information including the error angle corresponds to sections 34a and 34b in which two doughnut-like shapes 32 and 33 overlap as shown in FIG. 5. Namely, the distance information between the base stations 11 and 12 and the terminal 31 corrected by using the angle information including the error angle have the doughnut-like shapes by Equation 4 shown below:

$$d_1 \times \sin(\phi_1-e_1) \le d_1'' \le d_1 \times \sin(\phi_1+e_1)$$

$$d_2 \times \sin(\phi_2-e_2) \le d_2'' \le d_2 \times \sin(\phi_2+e_2) \qquad \text{Equation 4}$$

In Equation 4, $d_1$ denotes the distance between the first base station 11 and the terminal 31, $d_2$ is the distance between the second base station 21 and the terminal 31, $d_1''$ is the distance between the first base station 11 and the terminal 31 corrected according to the angle information, and $d_2''$ is the distance between the second base station 21 and the terminal 31 corrected according to the angle information.

The calculation of the first location information of the terminal by using the corrected distances between the base stations 11 and 21 and the terminal 31 is performed by Equation 5 shown below:

$$(x_0-x_1)^2+(y_0-y_1)^2 \le d_1''^2$$

$$(x_0-x_2)^2+(y_0-y_2)^2 \le d_2''^2 \qquad \text{Equation 5}$$

In Equation 5, (x0, y0) denotes the location of the terminal 31 as the location measurement target, (x1, y1) and (x2, y2) denote the locations of the two base stations 11 and 21, and $d_1''$ and $d_2''$ denote the corrected distances between the two base stations 11 and 21 and the terminal 31, respectively.

In Equation 5, it is noted that the location (x0, y0) of the terminal as the location measurement target is the inside of the doughnut-like shape 31 having the first base station 11 located at $(x_1, y_1)$ as the center and having a thickness $d_1''$ and the inside of the doughnut-like shape 33 having the second base station located at $(x_2, y_2)$ as the center and having a thickness $d_2''$. When Equation 5 is calculated in union, the terminal as the location measurement target is located in the sections 34a and 34b in which the two doughnut-like shapes overlap.

The sections 34a and 34b in which the two doughnut-like shapes according to the distance information corrected according to the angle information including the error angle overlap has a reduced size compared with the area in which the two circles indicated by the dotted lines using the distance information before being corrected overlap or the area 30 in which the two circles indicated by the solid lines overlap, so it can be anticipated that the location measurement error of the terminal is reduced according to the reduction in the area. The location value of the terminal as the location measurement target can be calculated by using the AoA information and the error AoA information of the signal transmitted to the base station 31 by using the AOA scheme in the areas 34a and 34b in which the two doughnut-like shapes overlap, and as the areas 334a and 34b in which the two doughnut-like shapes 34 overlap is reduced, the location measurement error of the terminal can be reduced and the accuracy can be improved.

Figure 6:
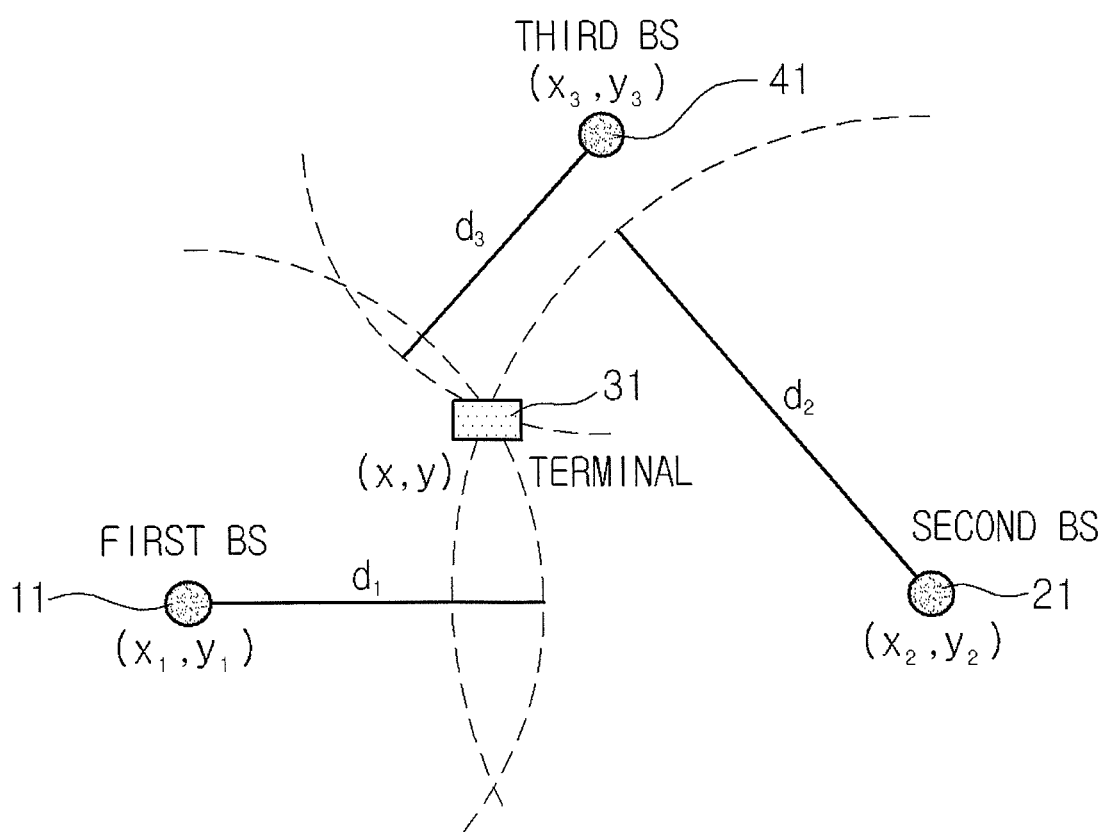
FIG. 6 is a view for explaining a location measurement method using triangulation.

FIG. 6 is a view for explaining a location measurement method using triangulation.

As shown in FIG. 6, in order to measure the location of the terminal 31 by using triangulation, at least three base stations receiving the signal of the terminal are required. Namely, the first base station 11, the second base station 21, and a third base station 41 calculate the location of the terminal 31 by using a ToA (Time of Arrival) received from the terminal 31.

In order to calculate the location value of the terminal, the respective base stations 11, 21, and 41 measure ToA t1, t2, and t3 of the signal transmitted from the terminal 31 and multiply the ToA by a transmission rate to calculate the distances $d_1$, $d_2$, and $d_3$ between the respective base stations 11, 21, and 41 and the terminal 31. And then, circles having the respective base stations 11, 21, and 41 as the center and the distance as the radius are drawn. Namely, a circle having the first base station 11 as the center and $d_1$ as the radius is drawn, a circle having the second base station 22 as the center and $d_2$ as the radius is drawn, and a circle having the third base station 41 as the center and $d_3$ as the radius is drawn. Coordinates of an intersection point where the three circles overlap are a location value of the terminal. In this case, the three circles may form an overlap portion having a certain area, rather than overlapping to form the intersection point, and such an overlap portion corresponds to an error generated in measuring the location of the terminal 31. Meanwhile, the location measurement error can be significantly reduced by reducing the overlap portion according to an exemplary embodiment of the present invention. This will now be described.

Figure 7:
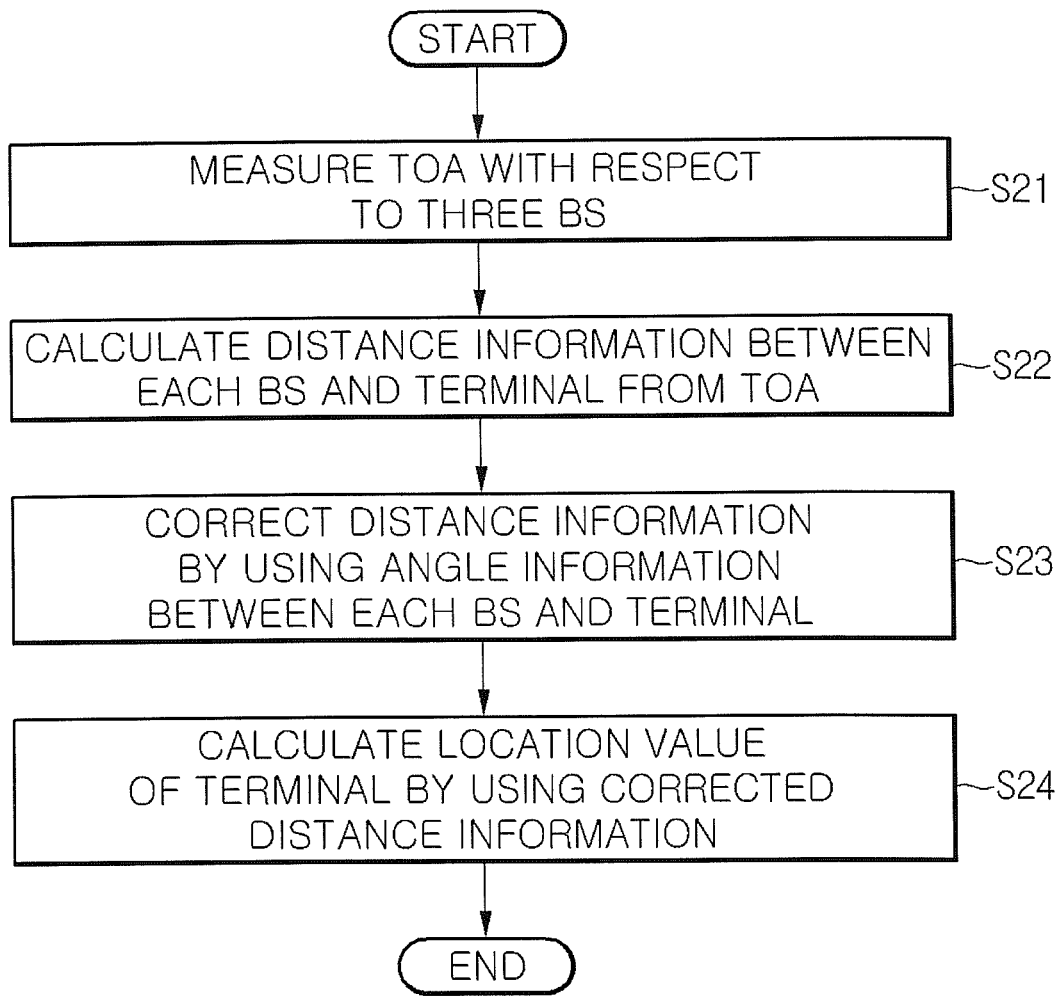
FIG. 7 is a flowchart illustrating the process of a method for measuring the location of a mobile terminal according to an exemplary embodiment of the present invention.

FIG. 7 is a flowchart illustrating the process of a method for measuring the location of a mobile terminal according to an exemplary embodiment of the present invention.

With reference to FIG. 7, according to the method for measuring the location of a mobile terminal according to an exemplary embodiment of the present invention, the terminal measures a ToA of a base station signal transmitted from each of the three base stations in operation S21. The terminal calculates distance information between the respective base stations and the terminal from the ToA in operation S22. The distance information between the respective base stations and the terminal can be calculated by the product of the ToA with respect to each of the base stations and a propagation transmission rate.

After the distance information is calculated by using the Toa, the distance information is corrected by using angle information between the respective base stations and the terminal in operation S23. The reason for correcting the distance information is because it relates to the method for measuring the location of the mobile terminal when the base station and the terminal are located within a short distance. Namely, when the base station and the terminal are located within a short distance, a vertical distance from the plane on which the terminal is located to the location of the base station is not such short as to be negligible compared with the distance between the base station and the terminal. Thus, since there is a considerable difference between the distance from the point of the base station projected to the plane on which the terminal is located to the terminal and the distance between the base station and the terminal, a great error occurs when the location value of the terminal is calculated by using the distance information between the base stations and the terminal calculated from the ToA.

Thus, in the method for measuring the location of a mobile terminal according to an exemplary embodiment of the present invention, the distance information is corrected by using the angle information between the respective base stations and the terminal, and then, the location value of the terminal is calculated by using the triangulation. The angle information will be described in detail with reference to FIG. 8.

Thereafter, the location value of the terminal is calculated by using the corrected distance information in operation S24. The location value of the terminal is calculated by the triangulation. Namely, when the corrected distance information corresponding to the first, second, and third base stations 11, 21, and 41 is $d_1'$, $d_2'$, and $d_3'$, respectively, three circles having the first, second, and third base stations 11, 21, and 41 as the center and $d_1'$, $d_2'$, and $d_3'$ as the radius, respectively, are formed and an intersection point where the three circles overlap is calculated as the location value of the terminal.

Figure 8:
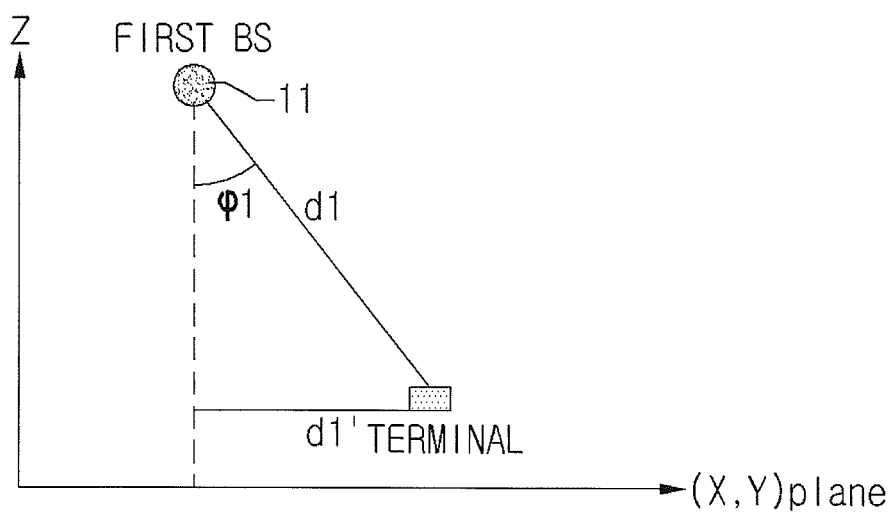
FIG. 8 is a view for explaining angle information between a base station and a terminal.

FIG. 8 is a view for explaining angle information between a base station and a terminal.

With reference to FIG. 8, the method for measuring the location of a mobile terminal according to an exemplary embodiment of the present invention is applied when the base station 11 and the terminal 31 are located within a short distance so a vertical distance from the plane on which the terminal 31 is located, i.e., from the xy plane, to the first base station 11 (or the second base station, the third base station) is not such short as to be negligible compared with the distance $d_1$ between the first base station 11 and the terminal 31. Namely, when the base station 11 and the terminal 31 are located within a short distance, there is a considerable difference between the distance $d_1'$ from the point formed by moving the first base station 11 to the plane on which the terminal 31 is located such that it is perpendicular to the plane to the terminal 31 and the distance $d_1$ between the first base station 11 and the terminal 31. Thus, the location measurement error of the terminal 31 can be reduced by correcting the distance information $d_1$.

In order to correct the distance information, the distances between the three base stations and the terminal calculated from the ToA with respect to the three base stations and the angle information between the base stations and the terminal are required. The angle information include an angle $\phi 1$ between a segment formed by vertically connecting the first base station 11 to the plane on which the terminal 31 is located and a segment formed by connecting the first base station 11 to the terminal 31, an angle $\phi 2$ between a segment formed by vertically connecting the second base station 21 to the plane on which the terminal 31 is located and a segment formed by connecting the second base station 21 to the terminal 31, and an angle $\phi 3$ between a segment formed by vertically connecting the third base station 41 to the plane on which the terminal 31 is located and a segment formed by connecting the third base station 41 to the terminal 31.

The correction of the distances between the base stations 11, 21, and 41 and the terminal 31 by using the angle information is performed by Equation 6 shown below:

$$d_1'=d_1\times\sin(\phi_1)$$
$$d_2'=d_2\times\sin(\phi_2)$$
$$d_3'=d_3\times\sin(\phi_3) \quad \text{Equation 6}$$

In Equation 6, $d_1$ denotes the distance between the first base station 11 and the terminal 31, $d_2$ denotes the distance between the second base station 21 and the terminal 31, $d_3$ denotes the distance between the third base station 41 and the terminal 31, $d_1'$ denotes the corrected distance between the first base station 11 and the terminal 31, $d_2'$ denotes the corrected distance between the second base station 21 and the terminal 31, and $d_3'$ denotes the corrected distance between the third base station 41 and the terminal 31.

Figure 9:
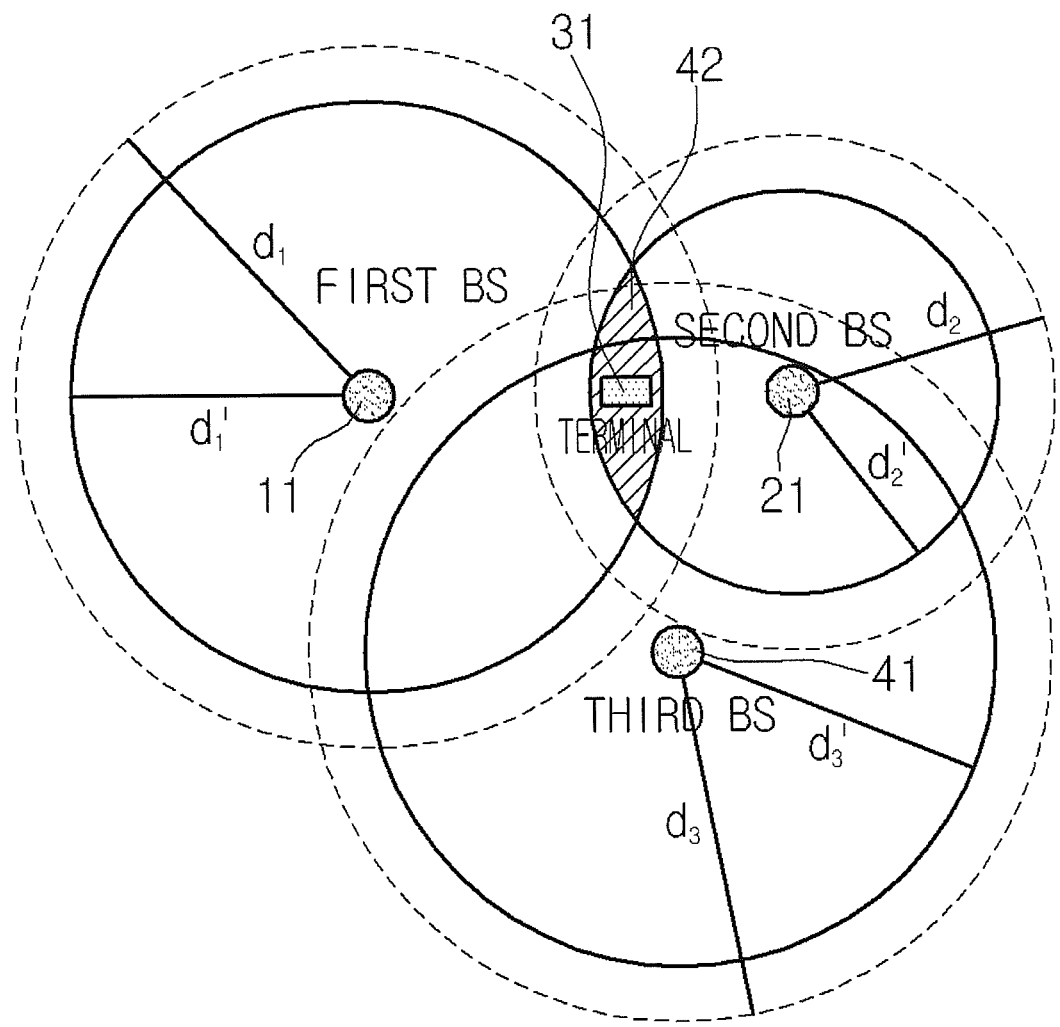
FIGS. 9 and 10 are views for explaining a calculation of a location value of a terminal in the method for measuring the location of a mobile terminal according to an exemplary embodiment of the present invention.
Figure 10:
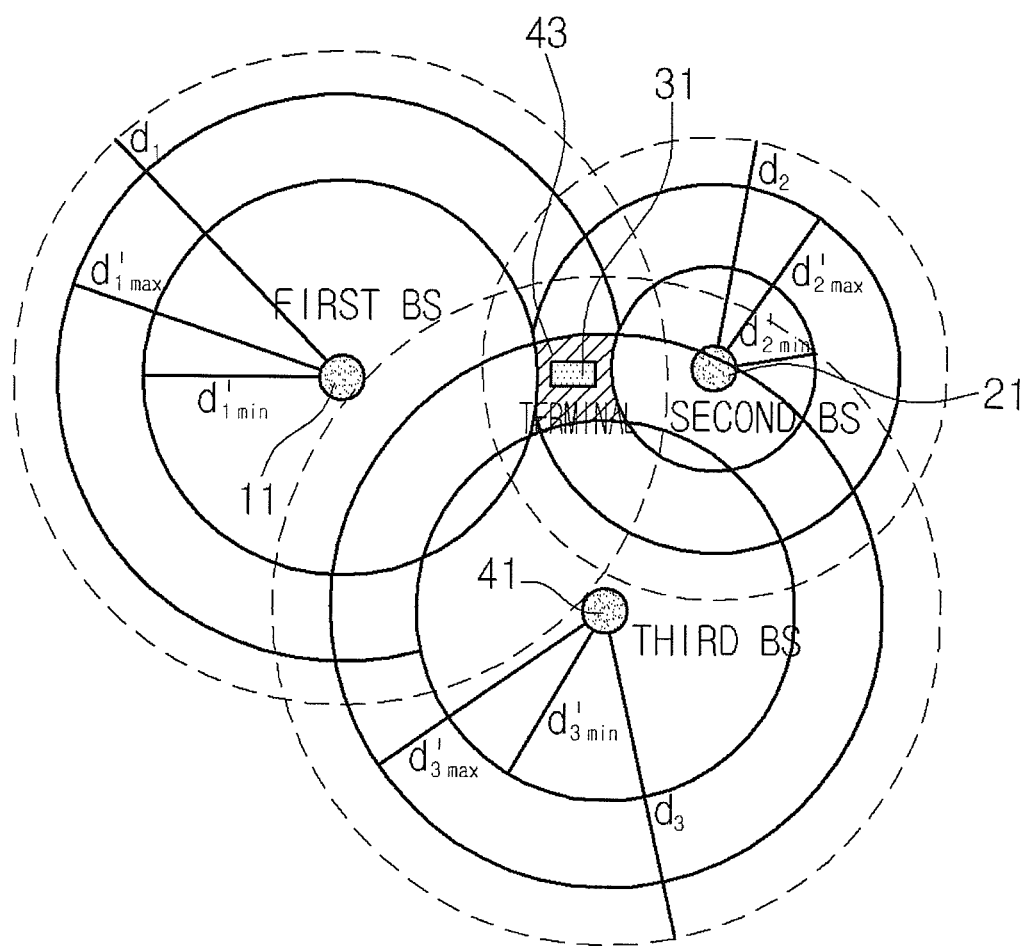

FIGS. 9 and 10 are views for explaining a calculation of a location value of a terminal in the method for measuring the location of a mobile terminal according to an exemplary embodiment of the present invention.

First, the process of calculating the location value of the terminal will be described with reference to FIG. 9. the calculation of the location value of the terminal 31 by using the corrected distances between the base stations 11, 21, and 41 and the terminal 31 is performed by Equation 7 shown below in which $(x_0, y_0)$ denotes the location of the terminal 31 as the location measurement target, and $(x_1, y_1)$, $(x_2, y_2)$, and $(x_3, y_3)$ denote the locations of the three base stations 11, 21, and 41, respectively.

$$(x_0-x_1)^2+(y_0-y_1)^2 \leq d_1'^2$$

$$(x_0-x_2)^2+(y_0-y_2)^2 \leq d_2'^2$$

$$(x_0-x_3)^2+(y_0-y_3)^2 \leq d_3'^2 \quad \text{Equation 7}$$

In equation 7, it is noted that the location (x0, y0) of the terminal 31 as the location measurement target is the inside of a circle having the first base station 11 located at $(x_1, y_1)$, the second base station 21 located at $(x_2, y_2)$ as the center, and the third base station 41 located as $(x_3, y_3)$ as the center and having radiuses $d_1'$, $d_2'$, and $d_3'$, respectively. When Equation 2 is calculated in union, the location $(x_0, y_0)$ of the terminal 31 as the location measurement target is located at a portion in which the circle having (x1, y1) as the center and having the radius $d_1'$, the circle having (x2, y2) as the center and having the radius $d_2'$, and the circle having (x3, y3) as the center and having the radius $d_3'$ overlap.

When the three circles overlap to form an intersection point, the intersection point corresponds to the location value of the terminal. However, with reference to FIG. 9, the portion where the three circles overlap has a certain area, rather than an intersection point. This corresponds to an error generated in measuring the location of the terminal. With reference to FIG. 9, the three circles indicated by dotted lines are formed according to the distance information before being corrected, the three circles indicated by sold lines are formed according to the distance information corrected by using the angle information between the respective base stations and the terminal. It is noted that an area 42 in which the three circles indicated by the solid lines is smaller than the area in which the three circles indicated by the dotted lines overlap. This means that the location measurement error is reduced according to the correction of the distance information by using the angle information and the accuracy is improved.

Meanwhile, the angle information between the base stations and the terminal may include an error angle. The process of calculating a location value of the terminal by correcting the distance information between the respective base stations and the terminal will now be described with reference to FIG. 9.

The angle information in consideration of the error angle is $\phi_1 \pm e_1$ over the first base station 11, $\phi_2 \pm e_2$ over the second base station 21, and $\phi_3 \pm e_3$ over the third base station 41. The calculation of the location value of the terminal by using the corrected distances between the base stations and the terminal is performed by Equation 8 shown below in which $(x_0, y_0)$ denotes the location of the terminal as the location measurement target, and $(x_1, y_1)$, $(x_2, y_2)$ and $(x_3, y_3)$ denote the locations of the three base stations, respectively.

$$d_{1'min}^2 \leq (x_0-x_1)^2+(y_0-y_1)^2 \leq d_{1'max}^2$$

$$d_{2'min}^2 \leq (x_0-x_2)^2+(y_0-y_2)^2 \leq d_{2'max}^2$$

$$d_{3'min}^2 \leq (x_0-x_3)^2+(y_0-y_3)^2 \leq d_{3'max}^2 \quad \text{Equation 8}$$

where, $d_{1'max}=d_1 \times \sin(\Phi_1+e_1)$, $d_{1'min}=d_1 \times \sin(\Phi_1-e_1)$, $d_{2'max}=d_2 \times \sin(\Phi_2+e_2)$, $d_{2'min}=d_2 \times \sin(\Phi_2-e_2)$, $d_{3'max}=d_3 \times \sin(\Phi_3+e_3)$, and $d_{3'min}=d_3 \times \sin(\Phi_3-e_3)$.

According to Equation 8, it is noted that the location (x0, y0) of the terminal 31 as the location measurement target is the inside of the doughnut-like shape having the first base station 11 located at $(x_1, y_1)$, the second base station 21 located at $(x_2, y_2)$, and the third base station 41 located at $(x_3, y_3)$ as the center and having a certain width. When Equation 3 is calculated in union, the location $(x_0, y_0)$ of the terminal 31 can be calculated. Namely, the terminal 31 is located at a portion 43 in which the doughnut-like shape having $(x_1, y_1)$ as the center and having a width $d_{1'max}-d_{1'min}$, the doughnut-like shape having $(x_2, y_2)$ as the center and having a width $d_{2'max}-d_{2'min}$, and the doughnut-like shape having $(x_3, y_3)$ as the center and having a width $d_{3'max}-d_{3'min}$. With reference to FIGS. 9 and 10, it is noted that the area of the portion 43 in which the three doughnut-like shapes formed by correcting the distance information according to the angle information in consideration of the error angle overlaps is narrower than that of the portion in which the three circles formed by correcting the distance information between the respective base stations 11, 21, and 41 and the terminal 31 according to the angle information without considering the error angle overlaps. The reduction in the area of the overlap portion indicates that the location measurement error of the terminal is reduced and the accuracy of the location measurement is improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for measuring a location of a mobile terminal, the method comprising:
    calculating first location information by using a Time of Arrival (ToA) scheme;
    calibrating the first location information by using angle information between two base stations and the terminal;
    calculating second location information by using an Angle of Arrival (AoA) scheme; and
    calculating a location value of the terminal by using the calibrated first location information and the second location information,
    wherein the first location information is calibrated by using a sine value of the angle information between the two base stations and the terminal.

2. The method according to claim 1, wherein, in the calculating of the first location information by using the ToA scheme, two items of distance information between the two base stations and the terminal are calculated by using two items of time information as a ToA of the signals transmitted from the terminal to the two base stations, and the first location information is calculated by using the two items of distance information.

3. The method according to claim 2, wherein the angle information comprises segments extending from the two base stations and formed to be perpendicular to the plane on which the terminal is located and two angles formed by the segments connecting the two base stations and the terminal, respectively.

4. The method according to claim 3, wherein, in the calibrating of the first location information by using the angle information between the two base stations and the terminal, the first location information is calibrated by using two items of distance information which have been corrected by multiplying the two items of distance information by a sine value of the two angles.

5. The method according to claim 1, wherein, in the calculating of the second location information by using the AoA scheme, the second location information is calculated by using two items of AoA information regarding the signals transmitted from the terminal to the two base stations.

6. A method for measuring a location of a mobile terminal, the method comprising:
   calculating distance information between each of three base stations and the terminal by using a Time of Arrival (ToA) with respect to the three base stations adjacent to the terminal;
   correcting the distance information by using angle information between each of the base stations and the terminal; and
   calculating a location value of the terminal by using the corrected distance information,
   wherein the distance information is corrected by using a sine value of the angle information between each of the base stations and the terminal.

7. The method according to claim 6, wherein the angle information comprises segments extending from the three base stations and formed to be perpendicular to the plane on which the terminal is located and three angles formed by the segments connecting the three base stations and the terminal, respectively.

8. The method according to claim 7, wherein, in the correcting of the distance information, the distance information with respect to the respective base stations is corrected by multiplying the distance information by a sine value of the angles.

9. The method according to claim 8, wherein, in the calculating of the location value of the terminal by using the corrected distance information, three circles having the locations of the respective base stations as a center and having the corrected distance as a radius are formed and the location value of the terminal may be calculated starting from a portion in which the three circles overlap.

10. The method according to claim 7, wherein the three angles may include an error angle.

11. The method according to claim 10, wherein, in the calculating of the location value of the terminal by using the corrected distance information, the location value of the terminal may be calculated starting from a portion in which three doughnut-like shapes formed based on the locations of the respective base stations according to the corrected distance information by using the angle information including the error angle.

* * * * *